United States Patent [19]

Draganoff et al.

[11] Patent Number: 6,023,522
[45] Date of Patent: Feb. 8, 2000

[54] INEXPENSIVE ADAPTIVE FINGERPRINT IMAGE ACQUISITION FRAMEGRABBER

[76] Inventors: Georgi H. Draganoff, 3235 Shoreline Drive, Oakville, Ontario, Canada, L6L 5Z1; Torsten Tiedtke, 4003 Governor's Road, Lynden, Ontario, Canada, L0R 1T0

[21] Appl. No.: 08/851,068

[22] Filed: May 5, 1997

[51] Int. Cl.$^7$ .................................................... G06K 9/00
[52] U.S. Cl. ........................... 382/124; 382/270; 348/572
[58] Field of Search .................. 382/124–127, 382/222, 218, 172, 270, 170, 115–116, 103, 176, 197, 272; 348/571–572, 321, 559, 439; 340/825.34; 356/71; 358/446, 461

[56] References Cited

U.S. PATENT DOCUMENTS

| | | | |
|---|---|---|---|
| 3,713,100 | 1/1973 | Hemstreet | 382/222 |
| 4,581,760 | 4/1986 | Schiller et al. | 382/124 |
| 4,696,046 | 9/1987 | Schiller | 382/125 |
| 4,742,551 | 5/1988 | Deering | 382/170 |
| 4,752,966 | 6/1988 | Schiller | 382/125 |
| 4,896,363 | 1/1990 | Taylor et al. | 382/125 |
| 5,067,162 | 11/1991 | Driscoll, Jr. et al. | 382/126 |
| 5,146,548 | 9/1992 | Bijnagte | 395/117 |
| 5,151,945 | 9/1992 | Lee et al. | 382/103 |
| 5,204,761 | 4/1993 | Gusmano | 358/461 |
| 5,291,307 | 3/1994 | Luckhurst | 358/446 |
| 5,309,486 | 5/1994 | Lichauer et al. | 376/248 |
| 5,420,937 | 5/1995 | Davis | 382/125 |
| 5,467,403 | 11/1995 | Fishbine et al. | 382/116 |
| 5,565,916 | 10/1996 | Katayama et al. | 348/321 |
| 5,717,469 | 2/1998 | Jennes et al. | 348/571 |
| 5,768,441 | 6/1998 | Yoshizawa et al. | 382/270 |

FOREIGN PATENT DOCUMENTS

| | | | |
|---|---|---|---|
| 0 125 532 A2 | 4/1984 | European Pat. Off. | G07C 9/00 |
| 0 251 504 A2 | 3/1987 | European Pat. Off. | G07C 9/00 |
| 0 479 621 | 4/1992 | European Pat. Off. | G06F 15/64 |
| 0 527 021 | 2/1993 | European Pat. Off. | H04N 1/40 |
| WO 97/38392 | 4/1996 | WIPO | G06K 9/00 |

*Primary Examiner*—Leo H. Boldreau
*Assistant Examiner*—Ishrat Sherali

[57] ABSTRACT

An advanced low cost adaptive frame grabber is described. Its main area of application is in fingerprint identification and verification systems, but it could successfully be used in other biometric identification systems, such as facial, iris or eye identification and/or verification systems. The invented framegrabber is also very suitable for all applications in other areas, like medical electronics, car electronics etc., where automatic image enhancement and/or transformation from grey scale to line art is required. The adaptive framegrabber automatically estimates the dynamic range of the acquired image and sets up a proper offset and measurement range for a video analog to digital converter (ADC). It could also be operated in two different modes, in one the image is acquired as a full grey scale image, and in the other—as a line art (black and white) image. Full controls over the image size and resolution are provided.

2 Claims, 5 Drawing Sheets

INEXPENSIVE ADAPTIVE FINGERPRINT IMAGE ACQUISITION FRAMEGRABBER

BACKGROUND OF THE INVENTION

In their majority, contemporary fingerprint identification and verification systems are personal computer based and use standard general purpose video frame grabbers to acquire images from fingerprint image scanner devices. Those video frame grabbers are designed to acquire video signals from various types of video sources. Changes to acquisition parameters are done manually through the video grabber software manager. This, however, does not allow the automation of some particular operations essential for proper acquisition of fingerprint images, like the automatic adjustment of the offset and measurement range of the video analog to digital converter to compensate the differences between acquired images and automatic finger placement detection. The whole acquired image is usually digitized and saved in memory, even if only part of it is necessary for the particular application. Also the acquired frames are always saved in memory as grey scale images and if the application requires a line art (black and white) image, it has to be converted additionally, which wastes computer time, especially in real time applications. There is also usually not much control over which and how many frames to skip and respectively acquire.

SUMMARY OF THE INVENTION

A highly integrated adaptive framegrabber for fingerprint image acquisition is described.

The framegrabber can be easily adjusted to acquire each frame from the input RS170 compliant video signal, or to acquire each second, each third, etc., frame.

The size of the image to be actually acquired from each frame is adjustable by means for defining how many lines are to be skipped at the beginning of the frame, how many lines are to be acquired; then how many pixels are to be skipped at the beginning of each line and how many pixels are to be acquired from each line. The size of the acquired pixels is also controllable.

The framegrabber preferably has two software controllable modes of operation: full grey scale, where the pixel depth is defined by the size of the output data word from the video ADC, and line art, where the pixel depth is just one bit deep (black and white).

At the beginning of an acquisition cycle, the framegrabber is preferably always in a grey scale mode of operation. A window of pixels is extracted from a first acquired frame. An average vector is calculated from this window. This vector is used preferably for two different purposes when the framegrabber is used for fingerprint image acquisition.

The first purpose is to detect whether a finger has been placed on the fingerprint scanner device. This is done by comparing the calculated vector to a predefined threshold. If the result of comparison is negative, a next frame is acquired, a window is extracted, and an average vector calculated. This operation repeats until a positive comparison is detected or the system times out.

The second purpose for which the average vector is calculated (in the preferred embodiment) is to help select proper offset and measurement range information for a video analog to digital converter (ADC). This is done by using the last calculated average vector to select optimum values for the offset and measurement range of the video ADC and downloading them to a dual digital to analog converter (DAC), providing necessary references for the video ADC. Thus the dynamic range of the video ADC always matches the dynamic range of the acquired image.

After the optimum range and offset have been adjusted, the framegrabber can be either left to acquire next images in full grey scale mode of operation, or switched to a line art mode of acquisition. In this last case, next frames to be acquired will be automatically transformed into line art images, and saved in the memory having pixels containing only two values, hexadecimal numbers 00 or FF (in case of 8-bit video ADC data bus).

The preferred embodiment of the adaptive framegrabber for fingerprint image acquisition, according to the present invention, includes a central processing unit (CPU), which controls and synchronizes the operation of all parts comprising the adaptive framegrabber, a memory to save acquired frames, a video analog to digital converter (ADC) with controllable measurement range and offset, or top and bottom of the range; a dual digital to analog converter (DAC) to provide necessary references for the video ADC, a timer to define the conversion cycle of the video ADC and to cause periodic direct memory access (DMA) requests, a direct memory access controller (DMA) to read data from the digital outputs of the video ADC and save it in predefined successive addresses in the memory. A video synchronization pulse decoder, extracting frame and line synchronization pulses from the input RS170 compliant video signal, and a CPU controlled grey scale/line art buffer, transparent to the input data stream when in grey scale mode of operation, and transforming, on the fly, the input grey scale data stream into line art output data stream.

In the preferred embodiment, the CPU, the DMA controller, and the timer are integrated into one multifunctional block, but any other combinations are possible, depending on a particular application.

BRIEF DESCRIPTION OF THE DRAWINGS

In describing a preferred embodiment, reference is made to the accompanying drawings, wherein.

DETAILED DESCRIPTION OF THE PREFERRED EMBODIMENT

Figure 1:
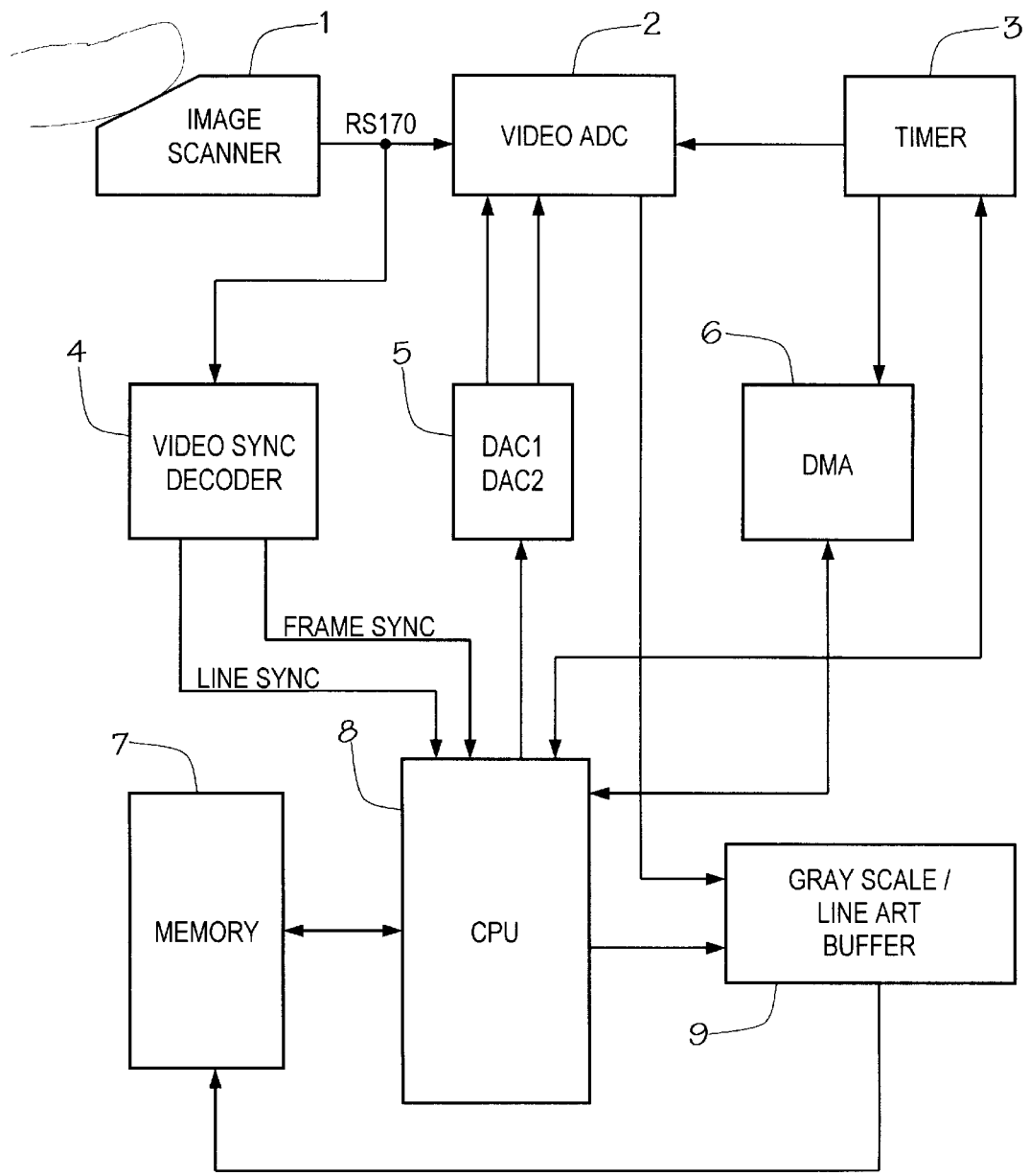
FIG. 1 shows a block diagram of a preferred embodiment specialized adaptive framegrabber for fingerprint image acquisition.

FIG. 1 shows the overall structure of a preferred embodiment of a specialized adaptive framegrabber for fingerprint image acquisition. The preferred implementation is based on Motorola's DSP56303 digital signal processor, which incorporates on a single chip a central processing unit (CPU) 8, a direct memory access controller 6, and a timer 3. Additionally, FIG. 1 shows an analog to digital converter (ADC) 2 which preferably is a Microlinear ML6401 and dual digital to analog converter 5, preferably a ML2330, but any other implementation based on different type of suitable components is possible.

A RS170 compliant video signal comes out of the preferred embodiment fingerprint scanner device 1 (or other source of video signal if the application is different) and is applied to the input of the video ADC 2 and a video synchronization decoder 4 simultaneously.

The timer 3 is initialized for pulse width mode of operation, and its output is enabled and connected to the "start conversion" input of the video ADC2.

Preferably the direct memory access (DMA) controller 6 is initialized for single word transfer in the request mode of operation. Timer 3 is the source of this request.

When the framegrabber is enabled, a signal from the frame line synchronization output of the video synchronization decoder 4, connected to one of the external interrupt lines of the CPU 8, is enabled and causes a CPU 8 vectored interrupt.

The CPU 8, after receiving the frame interrupt from the output of decoder 4, checks a preset counter maintaining a "frames to skip" count, which in this case is a software based counter. If the count is not zero, CPU 8 skips the current frame and subtracts one from the counter. When the counter value gets zero and the frame is to be acquired, the CPU 8 enables the interrupts from the line synchronization output of the synchronization decoder 4. This second line is also connected to another external interrupts line of the CPU 8. The CPU also recovers the preset value for frames to skip in the "frames to skip" counter.

After that, at each line interrupt the CPU 8 checks to see whether "zero" is in a special preset counter maintaining a "lines to skip" count. If the count is non-zero, CPU 8 subtracts one from the counter and does not acquire this line. This cycle repeats until the "lines to skip" counter reaches the value zero.

The next line synchronization interrupt (from decoder 4) causes following actions. The CPU 8 starts checking a preset "lines to acquire" counter for a count of zero at each consecutive line synchronization interrupt. The timer 3 is also enabled. After each consecutive interrupt, the CPU 8 loads into a timer compare register of the timer 3 a digit defining the number of pixels to be skipped (not acquired) at the beginning of the current line. When a positive comparison occurs, the CPU 8 enables the DMA 6 and the acquisition of pixels from the current line begins. The number of pixels to be acquired is predefined during initialization of the DMA 6, so, when this number is reached DMA 6 disables itself Note that all counters mentioned in this description of the preferred embodiment are software ones but they could be of any kind in other implementations. The DMA controller 6 reads the pixel values from the output of the video ADC 2 and saves them into consecutive addresses in memory 7.

Figure 2:
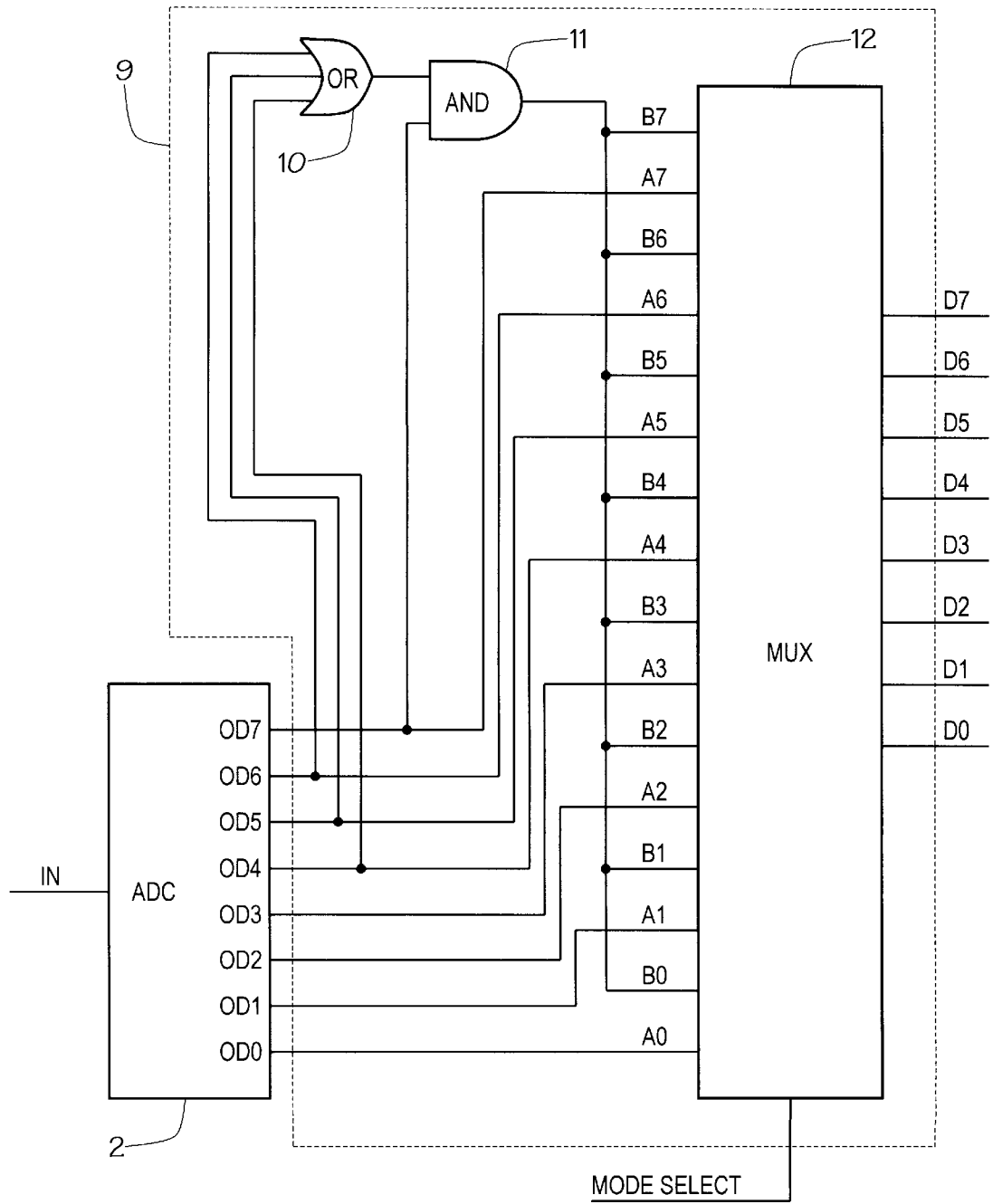
FIG. 2 shows an implementation of the grey scale/line art buffer.

FIG. 1 also shows a gray scale/line art buffer 9 connected on the bus between the output of the video ADC 2 and the memory 7. Its functionality will be described later, when FIG. 2 is explained.

The timer 3 defines the width of the pixels by controlling the timing between conversion cycles of the video ADC 2 and the requests to the DMA controller 6.

The cycle for consecutive line acquisition repeats itself until the counter "lines to acquire" reaches zero. This will mean that the portion of the frame to be acquired has been successfully acquired by the frame grabber. Line synchronization interrupts are then disabled, and the process repeats itself After next frame synchronization interrupt the CPU 8 checks if the frame has to be acquired and so on until the framegrabber is disabled.

The "frame to skip", "lines to skip" and "lines to acquire" counters are initialized (again) after a frame has been acquired.

This type of organization of the framegrabber allows easy automatic adaption to various video standards for black and white video (EIA, CCIR) and permits a most economical memory utilization. Only the useful part of the frame is saved in the memory 7, in the preferred embodiment. The option to skip several frames before acquiring a next one allows a very convenient option for real time processing in pauses between acquired frames. Another benefit from this arrangement is easy variation in the length of those pauses.

FIG. 2 shows the preferred embodiment of the gray scale/line art buffer 9. This functional block is placed between the digital outputs of the video ADC 2 and the memory 7.

Its main component is a two inputs to one output multiplexer 12, with a data word 21 length equal to the width of the bus between the video ADC 2 and the memory 7. Illustratively, multiplexer 12 is shown with eight output bits, D0 to D7. The multiplexer 12 has a mode select input controlled by the CPU 8. When this input is in a state corresponding to grey scale mode of operation, the multiplexer 12 inputs A0 . . . A7 are directly connected to its outputs D0 . . . D7 and the digital data saved into the memory 7 is exactly the data from the outputs of the video ADC 2.

When, however, the mode select input is in a state to enable the line art (black and white) mode of operation, the multiplexer 12 inputs B0 . . . B7 are connected to corresponding outputs D0 . . . D7. In this case, as it can be seen, the functional blocks "or" 10 and "and" 11 execute a Boolean equation so that, if a digital data word at the outputs of the video ADC 2 has a hexadecimal value less then hexadecimal 90, all B0 . . . B7 inputs and their corresponding outputs D0 . . . D7 of the multiplexer 12 will be forced to zero, and a hexadecimal digit 00 will be stored in memory 7. If, however, the digital data word at the output of the video ADC 2 is greater or equal to the hexadecimal number 90, then all B0 . . . B7 inputs and respectively D0 . . . D7 outputs of the multiplexer 12 will be forced to one, and the word to be saved in the memory 7 will have a hexadecimal value FF.

This way the grey scale/line art buffer 9 allows some or all of the acquired frames to be stored as grey scale images, and some or all of the frames to be acquired as line art images. The digital threshold of the grey scale/line art buffer 9 could of course be set to any number different from the selected hexadecimal value 90.

Figure 3:
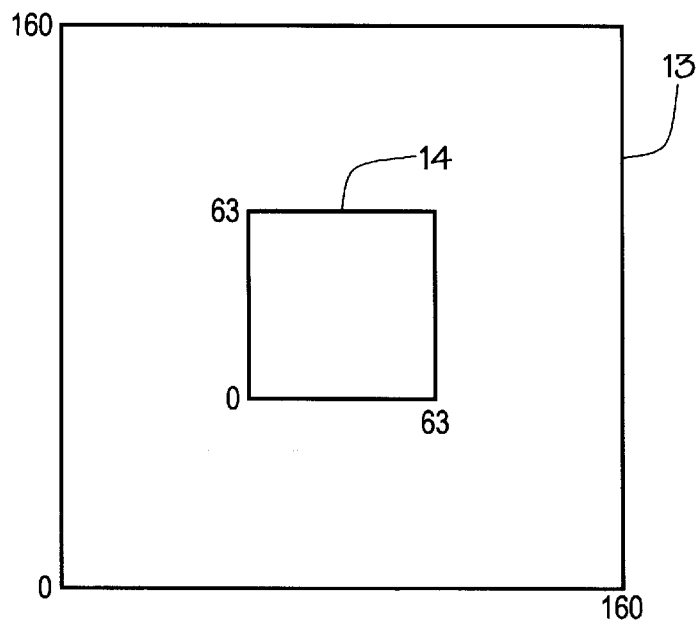
FIG. 3 represents an example of an acquired video frame, along with the window used to calculate the average vector inside.

FIG. 3 illustrates one of the ways to define a vector window 14 within acquired image 13. As it could be seen in this case, the image 3 has a size of 160×160 pixels and the vector window 14 occupies the middle part of this image with a size of 64×64 pixels. The average vector of the vector window 14 is calculated by adding the values of all pixels comprising this window and dividing their sum by the number of pixels comprising the vector window 14.

The average vector, calculated this way, is used for some adjustments, which will be described in enrollment and verification flowcharts for the framegrabber, shown on FIG. 5 and FIG. 6 respectively, are described.

Figure 6:
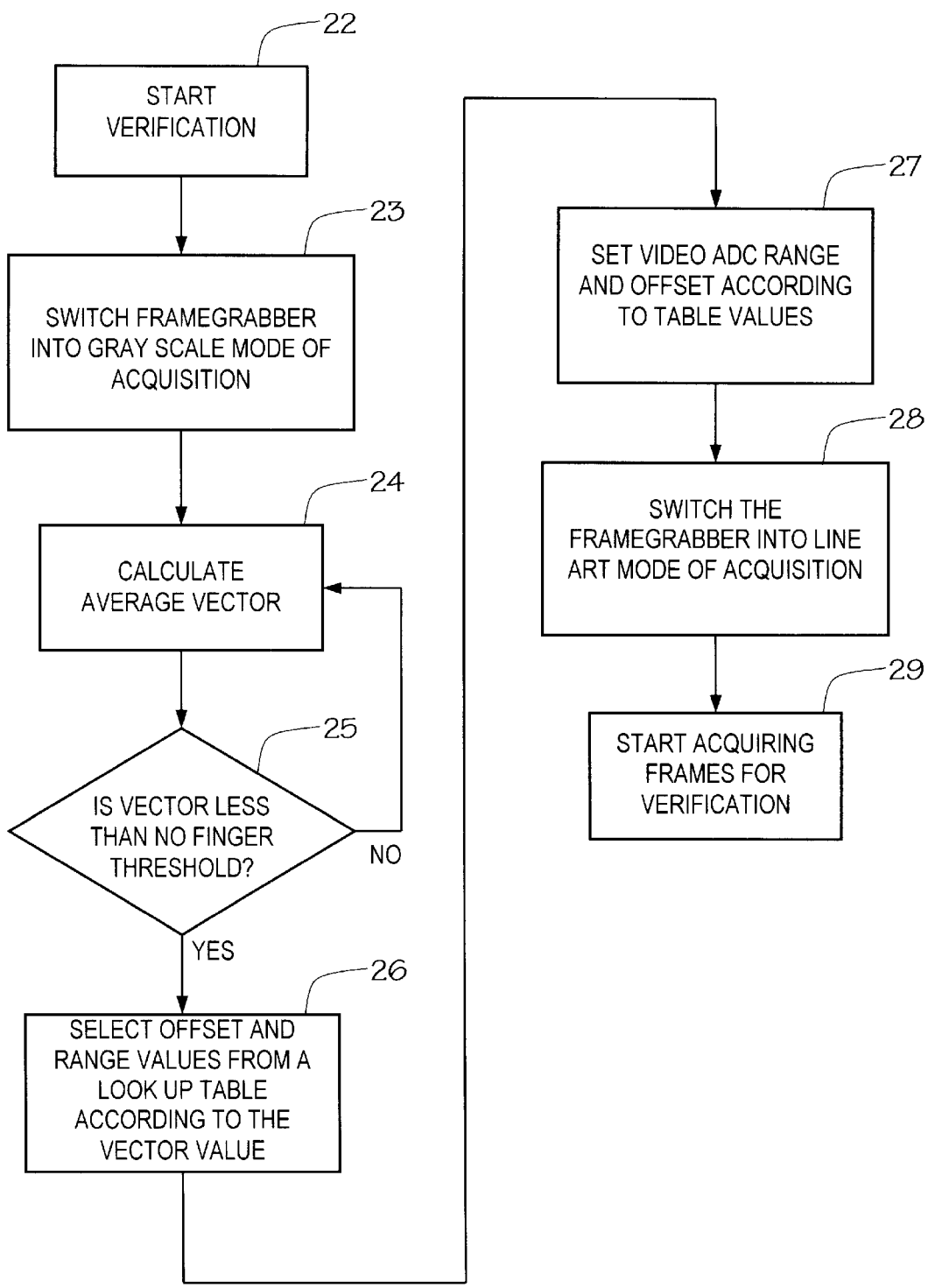
FIG. 6 shows a flowchart concerning the sequential operations of the adaptive framegrabber during verification algorithm execution.

FIG. 6 shows the flowchart of the adaptive framegrabber during a fingerprint verification process. After a command for the start of the fingerprint verification processes has been issued at step 22 by the CPU 8, the adaptive framegrabber is enabled and switched into grey scale mode of operation at step 23. After a first frame has been acquired (it is possible also to acquire only an image of the size of the vector window) the vector window is extracted and the average vector calculated at step 24. Then the average vector is compared at step 25 against a preset threshold value to determine if a finger for verification has been placed on the fingerprint image scanner 1. If the comparison fails, the same process repeats with the next frame—the average vector is calculated at 24 and again compared against the threshold 25, and so on until a positive result from comparison is detected, or the system times out. After the positive result of the comparison, the value of the last average vector calculated at 24 is used to select from a look up table values at step 26 for the best offset and measurement range of the video ADC 2. Another way to select a best offset and measurement range of the video ADC is to compare the average vector to a number of thresholds each corresponding to predetermined values for the offset and measurement range of the video ADC and select the closest one. The values for the best offset and measurement range are then downloaded at step 27 by the CPU 8 to digital to analog converters (DAC1/DAC2) 5, the outputs of which are connected to corresponding inputs of the video ADC 2. After this operation is completed, the adaptive framegrabber is switched into a line art mode of acquisition at step 28, if the verification algorithm requires such mode for its operation, and starts acquiring frames from the fingerprint image scanner 1 to be processed according to particular requirements of the chosen fingerprint verification algorithm. It is worth noting that the flowchart shown on FIG. 6 is quite suitable also for implementation with other image verification applications like face, iris, eye, etc.

Figure 4A:
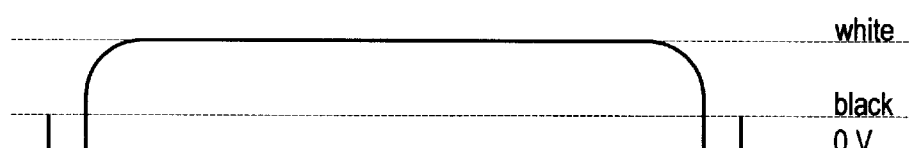
FIG. 4a shows the signal of a single tv line with no finger placed on the fingerprint image scanner.
Figure 4B:
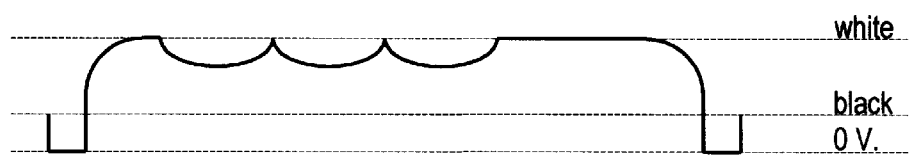
FIG. 4b shows the signal of a single tv line with relatively poor (pale) fingerprint image.
Figure 4C:
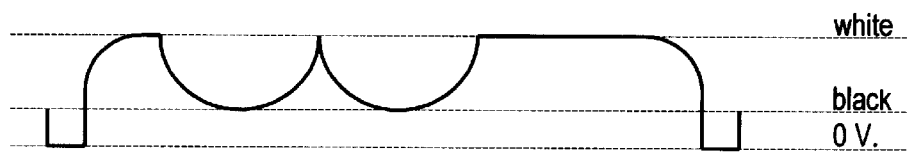
FIG. 4c shows a single tv line with a very good (high contrast) fingerprint image.

FIG. 4 helps to illustrate how the calculated average vector is used for finger placement detection and for proper adjustment of the offset and measurement range of the video ADC 2. FIG. 4a shows a video line signal corresponding to "no finger placed" on the fingerprint image scanner 1. The average vector calculated from a window comprised of this type of lines will have maximum value. FIG. 4b shows a video line signal corresponding to a poor (pale) fingerprint image, and FIG. 4c shows a video line signal corresponding to a sharp (high contract) fingerprint image. The average vector from the window corresponding to the signal on FIG. 4b will be smaller than that from FIG. 4a but greater than the one calculated from a window corresponding to the signal from FIG. 4c.

If a threshold is defined, lower than the one corresponding to FIG. 4a, but greater than the average vector corresponding to FIG. 4b, a "finger placed" detection will be easily and reliably realized.

At the same time in order to get similar quality digitized images from line signals shown on FIG. 4b and FIG. 4c, the measurement range and offset of the video ADC 2 should be adjusted on the basis of the average vectors' values in that the average vector from FIG. 4b will require greater value for the offset and smaller measurement range. This way the dynamic range of the video ADC 2 will fit more closely to the input signal and acquired images in both cases will be much closer in quality than the input signals, shown on FIG. 4b and FIG. 4c.

Figure 5:
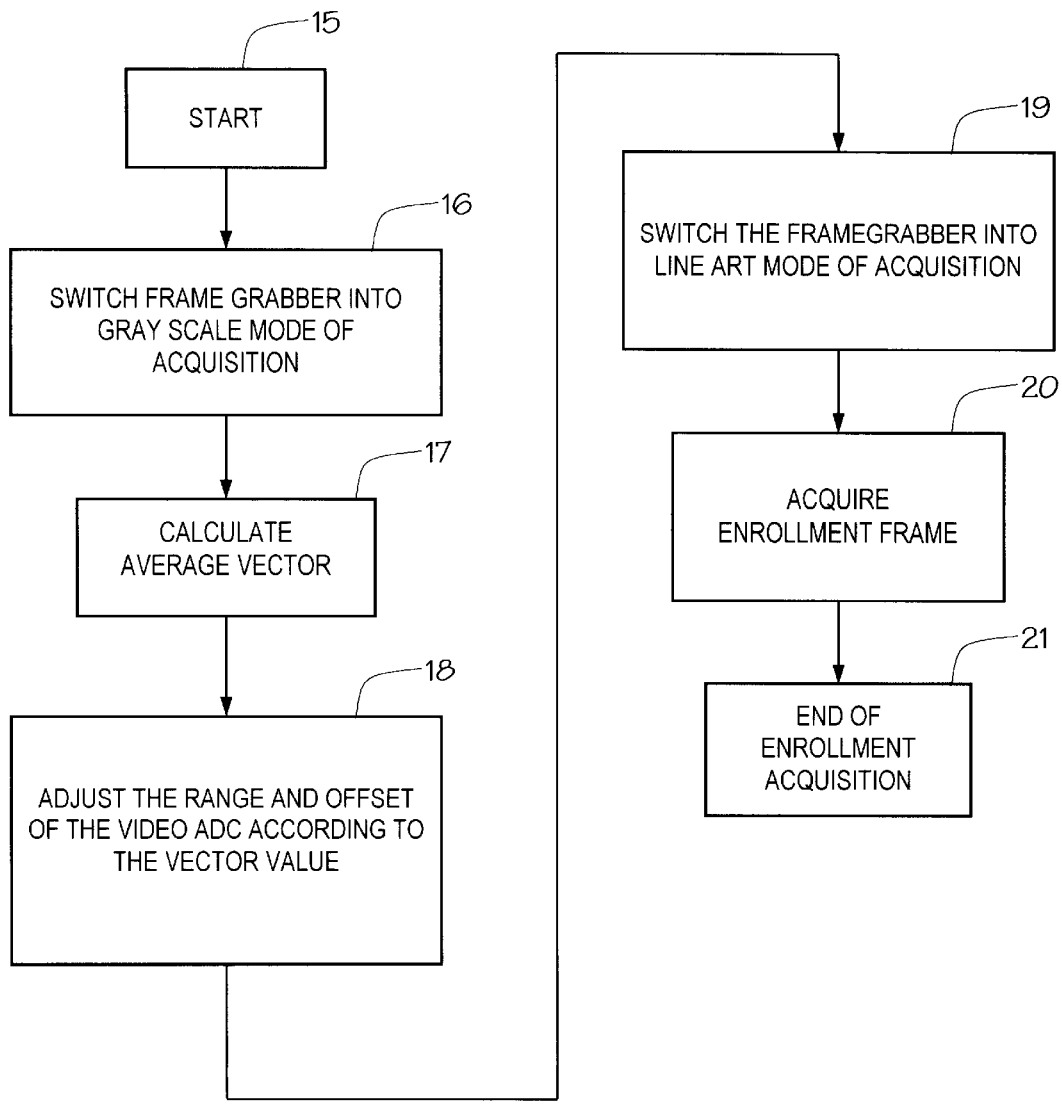
FIG. 5 shows a flowchart concerning the operation of the adaptive framegrabber during execution of the fingerprint enrollment algorithm.

FIG. 5 shows a flowchart for the adaptive framegrabber during a fingerprint enrollment process. This is the process when the image to produce the verification biocript is acquired.

The command start enrollment is issued at step 15 by the CPU 8 only after the finger to be enrolled has been properly placed on the fingerprint image scanner 1. After it has been issued, the framegrabber is switched into grey scale mode of operation at step 16; the average vector is calculated for the first frame at step 17, proper offset and measurement range are selected for the video ADC 2 and downloaded to DAC1/DAC2 at step 18. If the algorithm selected requires, the framegrabber is switched into line art mode of acquisition at 19 and the frame which will be used for enrollment purposes is acquired at 20 and this ends the enrollment acquisition process at 21. The framegrabber is then disabled by the CPU 8.

While the above described embodiments of the invention are the preferred ones, it is apparent to those skilled in the art that many other changes and modifications may be made, without departing from the invention in its broader aspects. Therefore, the intention of the claims is to cover such changes and modifications, falling within the true spirit and scope of the invention.

The embodiments of the invention, in which an exclusive property or privilege is claimed, are defines as follows:

We claim:

1. An adaptive image frame grabber comprising:
   an analog to digital converter, to digitize inputted image data;
   a memory, to save digitized image data from an output of said analog to digital converter;
   a central processing unit to control operations of said adaptive image grabber;
   wherein at the start of the frame grabber operation, an image window comprised by a predefined number of pixels is extracted from an acquired image frame, an average pixel vector is calculated, wherein the average pixel vector is related to the ratio of the sum of the values of said pixels within said window to said predefined number of pixels, and said average pixel vector is compared to a predetermined threshold value;
   wherein said average pixel vector is used to select an offset and measurement range of said analog to digital converter, and
   wherein if the result of a comparison is outside predetermined limits, at least one subsequent image frame is acquired and an average pixel vector is calculated for each of said subsequent frames the acquiring of a fingerprint image frame, extracting of said image window, calculating of said average pixel vector, and selecting of said offset and measurement range, repeating until the value of said average pixel vector is less than a first threshold value and a greater than a second threshold value.

2. An adaptive image frame grabber method comprising the steps of:
   acquiring an image frame;
   extracting an image window from an acquired image frame, wherein said image window is comprised of a predefined number of pixels;
   calculating from said predefined number of pixels an average pixel vector wherein the average pixel vector is related to the ratio of the sum of the values of said pixels within said window to said predefined number of pixels;
   comparing said average pixel vector to predetermined threshold values;
   selecting new measurement parameters of an image input device based on the value of said average pixel vector and repeating said acquiring of a fingerprint image frame, said extracting of an image window, said calculating of an average pixel vector, and said selecting of new measurement parameters, until the value of said average pixel vector is less than a first threshold value and greater than a second threshold value.

* * * * *